US012809975B2

(12) United States Patent
Medicherla et al.

(10) Patent No.: US 12,809,975 B2
(45) Date of Patent: Nov. 24, 2026

(54) MANAGING DIAGNOSTIC TESTING OF COMPUTING HARDWARE AT AN INFORMATION HANDLING SYSTEM

(71) Applicant: Dell Products L.P., Round Rock, TX (US)

(72) Inventors: Laxmi Lavanya Medicherla, Georgetown, TX (US); Ibrahim Sayyed, Georgetown, TX (US); Alan Helmy Abdelhalim, Pflugerville, TX (US); Viswanathan Sringapurathil Venugopal, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 19/064,905

(22) Filed: Feb. 27, 2025

(65) Prior Publication Data

US 2026/0252687 A1 Aug. 27, 2026

(51) Int. Cl.
*G06F 21/55* (2013.01)
*G06F 21/57* (2013.01)

(52) U.S. Cl.
CPC .......... *G06F 21/554* (2013.01); *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 12,361,142 | B1 * | 7/2025 | Plate | G06F 21/577 |
| 2025/0225252 | A1 * | 7/2025 | Kancham | G06F 21/577 |
| 2026/0111565 | A1 * | 4/2026 | Gousios | G06F 21/577 |
| 2026/0170144 | A1 * | 6/2026 | Santhanagopal | G06F 21/577 |
| 2026/0195563 | A1 * | 7/2026 | Belfy | G06N 3/043 |

* cited by examiner

*Primary Examiner* — Michael Pyzocha
(74) *Attorney, Agent, or Firm* — McDermott Will & Schulte LLP

(57) ABSTRACT

Managing diagnostic testing of computing hardware, including: identifying a particular computing hardware for performing a diagnostic test at, the particular computing hardware associated with a shared library; receiving telemetry data associated with the particular computing hardware; determining that the telemetry data indicates a possible security event associated with the particular computing hardware, and in response: providing data indicating the shared library to a third-party vulnerability scanning service; receiving, from the third-party vulnerability scanning service, data indicating a security vulnerability of the shared library, and in response: identifying a diagnostic test that is implemented at the particular computing hardware via side band communication channel of the particular computing hardware; implementing, through the side band communication channel, the diagnostic test at the particular computing hardware; determining that the diagnostic test failed at the particular computing device, and in response, performing, independent of user action, a corrective action at the particular computing hardware.

20 Claims, 3 Drawing Sheets

MANAGING DIAGNOSTIC TESTING OF COMPUTING HARDWARE AT AN INFORMATION HANDLING SYSTEM

BACKGROUND

Field of the Disclosure

The disclosure relates generally to an information handling system, and in particular, managing diagnostic testing of computing hardware at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer security, also known as cybersecurity, involves protecting computer systems and networks from theft, damage, and unauthorized access. It encompasses a variety of practices and technologies designed to safeguard data integrity, confidentiality, and availability. With the increasing reliance on digital systems, cybersecurity has become crucial in preventing cyberattacks and ensuring the safe operation of critical infrastructure. The field continuously evolves to address new threats and vulnerabilities, making it a dynamic and essential aspect of modern technology.

SUMMARY

Innovative aspects of the subject matter described in this specification may be embodied in a method of managing diagnostic testing of computing hardware of an information handling system, including identifying a particular computing hardware for performing a diagnostic test at, the particular computing hardware associated with a shared library; receiving telemetry data associated with the particular computing hardware; determining that the telemetry data indicates a possible security event associated with the particular computing hardware, and in response: providing data indicating the shared library to a third-party vulnerability scanning service; receiving, from the third-party vulnerability scanning service, data indicating a security vulnerability of the shared library; in response to receiving the data indicating the security vulnerability of the shared library: identifying a diagnostic test that is implemented at the particular computing hardware via a side band communication channel of the particular computing hardware; implementing, through the side band communication channel, the diagnostic test at the particular computing hardware; determining whether the diagnostic test was successful at the particular computing hardware; and determining that the diagnostic test failed at the particular computing device, and in response, performing, independent of user action, a corrective action at the particular computing hardware.

Other embodiments of these aspects include corresponding systems, apparatus, and computer programs, configured to perform the actions of the methods, encoded on computer storage devices.

These and other embodiments may each optionally include one or more of the following features. For instance, receiving the telemetry data includes receiving telemetry data including an indicator of attack (IOA) or an indicator of compromise (IOC) associated with the particular computing hardware. The shared library is a dynamic link library (DLL). The side band communication channel is between an embedded controller (EC) and the particular computing hardware. The diagnostic test is implemented independent of the shared library. Preventing another diagnostic test to be performed at the particular computing hardware that utilizes the shared library. Performing the remediation action further includes installing a new driver at the information handling system for the particular computing hardware. Performing the remediation action further includes installing a patch at the shared library.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
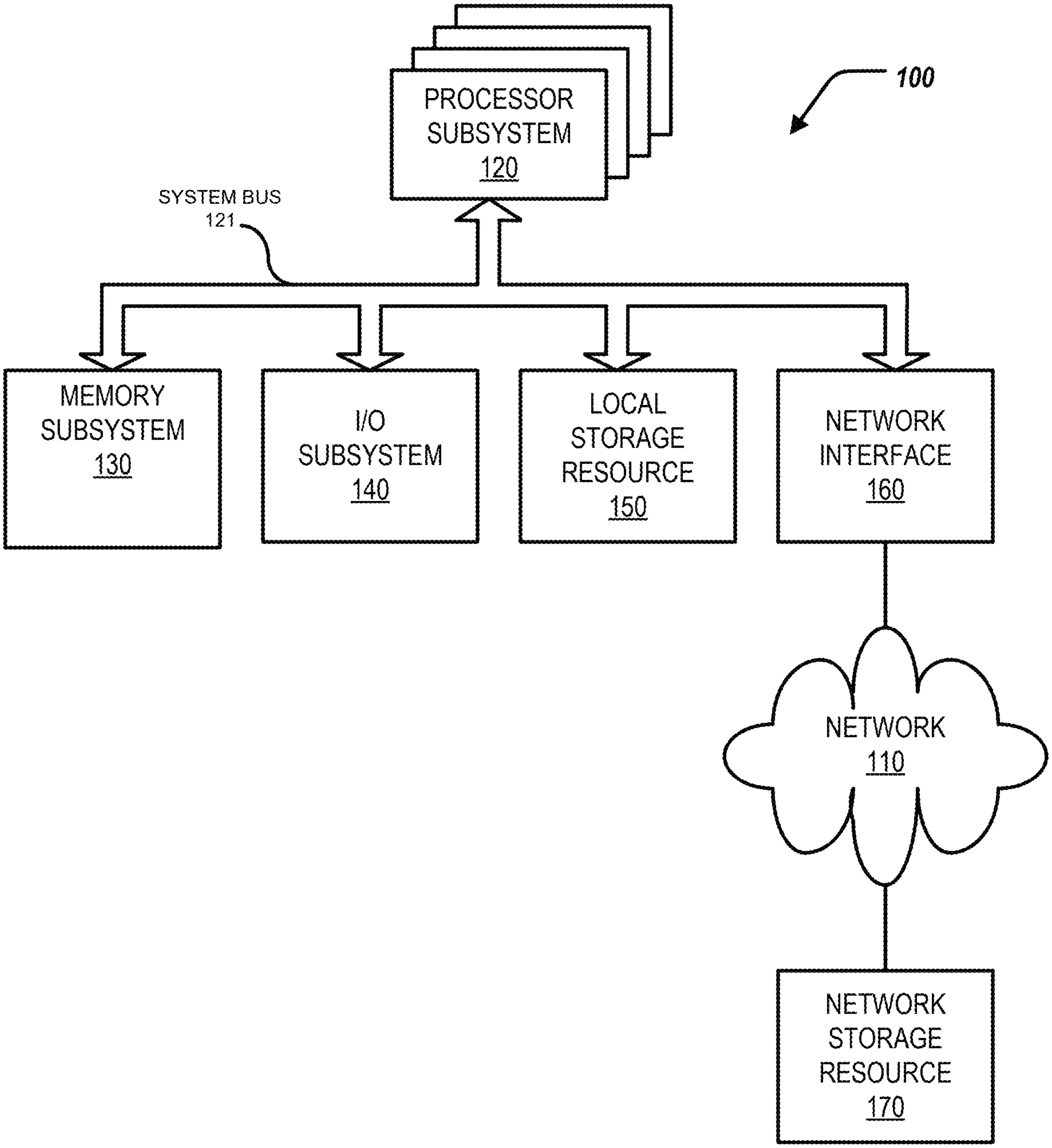
FIG. 1 is a block diagram of selected elements of an embodiment of an information handling system.

This disclosure discusses methods and systems for managing diagnostic testing of computing hardware of an information handling system. In short, the present invention describes a method and a system to characterize and decompose vulnerable computing hardware and shared libraries and dynamically evaluate options to use a sideband communication channel to test the computing hardware and shared libraries if the in-band communication path has an infected component. The information handling system can be vulnerable to elevation of privileges due to the shared library provided by a vendor. This vulnerability can allow untrusted services to gain elevated privileges, leading to potential indicators of attack and compromise of system components. Therefore, the present invention can analyze telemetry events such as hardware intrusion and firmware intrusion attempts, and communicate with the vulnerability scanning service computing module that contains vulnerability information about the impacted components of the information handling system. Actions can be taken to reduce the attack surface and implement policy-based restrictions until new drivers or software updates with fixes are available, described further herein.

Specifically, this disclosure discusses a system and a method for managing diagnostic testing of computing hardware of an information handling system, including identifying a particular computing hardware for performing a diagnostic test at, the particular computing hardware associated with a shared library; receiving telemetry data associated with the particular computing hardware; determining that the telemetry data indicates a possible security event associated with the particular computing hardware, and in response: providing data indicating the shared library to a third-party vulnerability scanning service; receiving, from the third-party vulnerability scanning service, data indicating a security vulnerability of the shared library; in response to receiving the data indicating the security vulnerability of the shared library: identifying a diagnostic test that is implemented at the particular computing hardware via a side band communication channel of the particular computing hardware; implementing, through the side band communication channel, the diagnostic test at the particular computing hardware; determining whether the diagnostic test was successful at the particular computing hardware; and determining that the diagnostic test failed at the particular computing device, and in response, performing, independent of user action, a corrective action at the particular computing hardware.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 2:
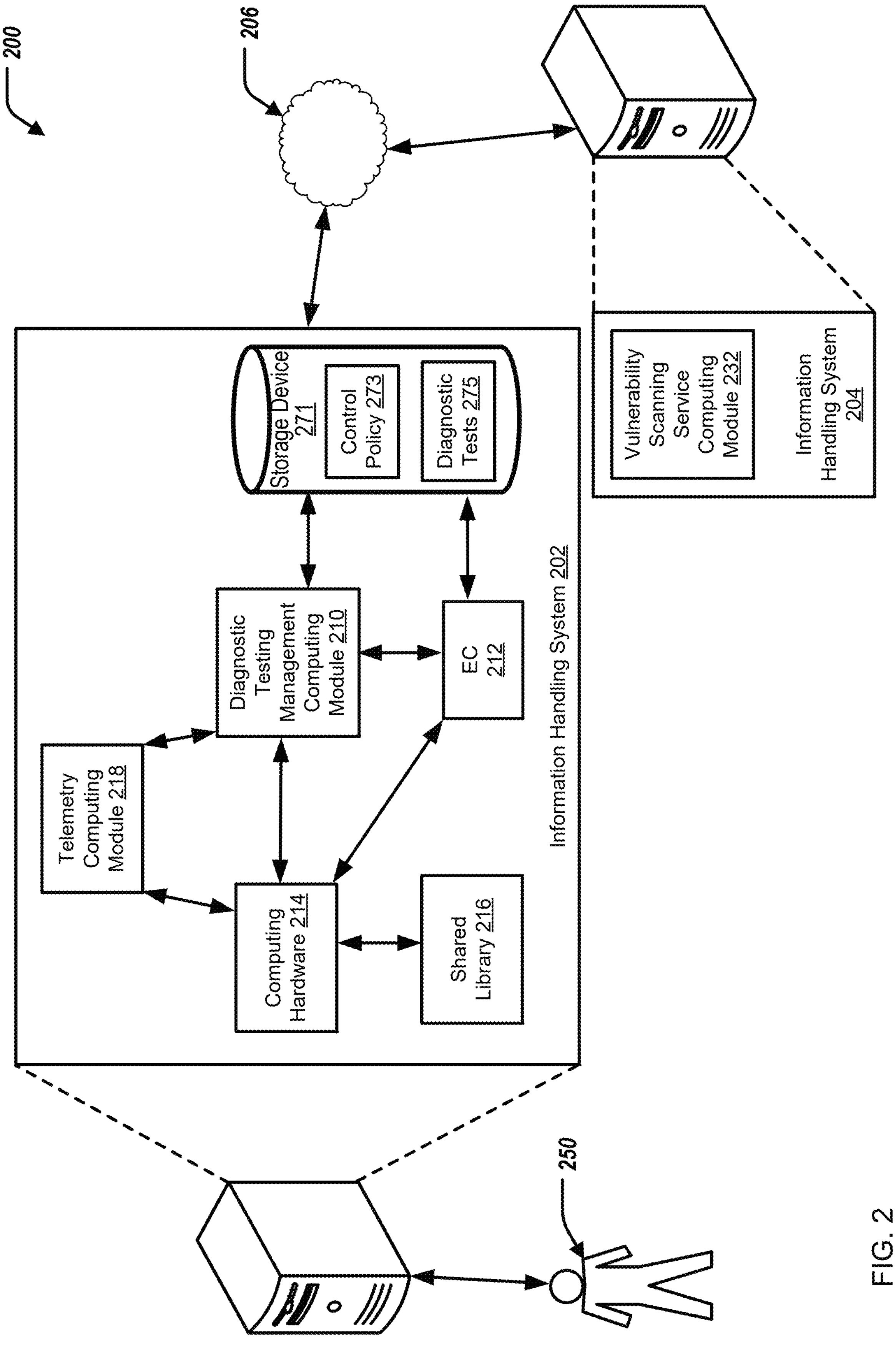
FIG. 2 illustrates a block diagram of an information handling system for managing diagnostic testing of computing hardware.
Figure 3:
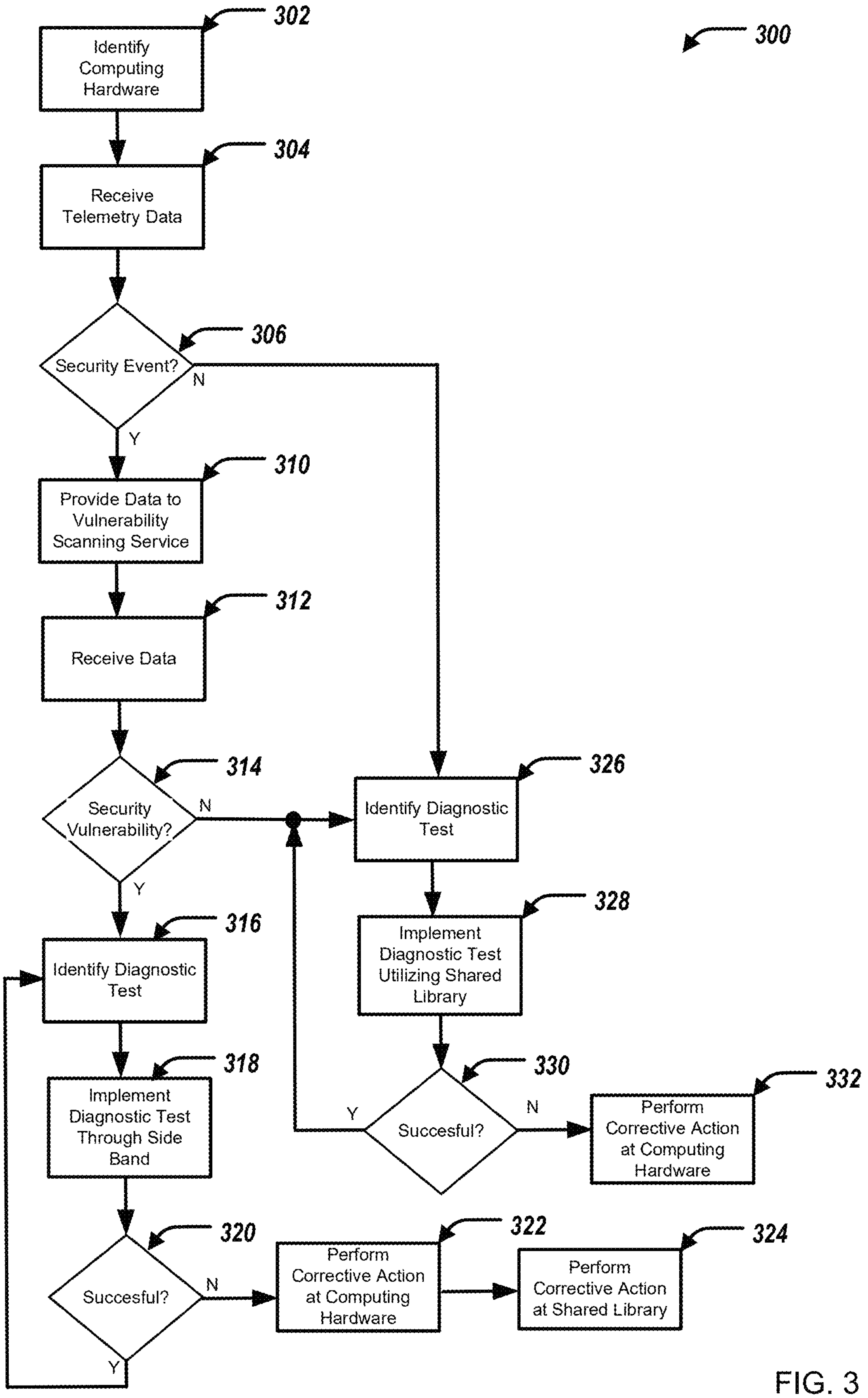
FIG. 3 illustrates a method for managing diagnostic testing of computing hardware.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202, a third-party information handling system 204, and a network 206. The information handling system 202 can include a diagnostic testing management computing module 210, an embedded controller (EC) 212, computing hardware 214, a shared library 216, a telemetry computing module 218, and a storage device 271. In some examples, the information handling system 202 is similar to, or includes, the information handling system 100 of FIG. 1. In some examples, the third-party information handling system 204 is similar to, or includes, the information handling system 100 of FIG. 1.

The diagnostic testing management computing module 210 can be in communication with the EC 212, the computing hardware 214, the telemetry computing module 218, and the storage device 271. The EC 212 can be in communication with the diagnostic testing management computing module 210, the computing hardware 214, and the storage device 271. The computing hardware 214 can be in communication with the diagnostic testing management computing module 210, the EC 212, the shared library 216, and the telemetry computing module 218. The telemetry computing module 218 can be in communication with the diagnostic testing management computing module 210 and the computing hardware 214.

The computing hardware can include a disk drive, video card, audio card, processor, memory, and the like.

The third-party information handling system 204 can include a vulnerability scanning service computing module 232.

The information handling system 202 can be in communication with the third-party information handling system 204 over the network 206 (e.g., the "Internet.").

In short, the present invention describes a method and a system to characterize and decompose vulnerable computing hardware 214 and shared libraries 216 and dynamically evaluate options to use a sideband communication channel to test the computing hardware 214 and shared libraries 216 if the in-band communication path has an infected component. The information handling system 202 can be vulnerable to elevation of privileges due to the shared library 216 provided by a vendor. This vulnerability can allow untrusted services to gain elevated privileges, leading to potential indicators of attack and compromise of system components. Therefore, the present invention can analyze telemetry events such as hardware intrusion and firmware intrusion attempts, and communicate with the vulnerability scanning service computing module 232 that contains vulnerability information about the impacted components of the information handling system 202. Actions can be taken to reduce the attack surface and implement policy-based restrictions until new drivers or software updates with fixes are available, described further herein.

The invention includes safeguarding and restricting diagnostic tests at runtime and enumeration time to reduce the attack surface and prevent elevation of privileges. Policy controls are used to restrict the affected diagnostic tests from running and to notify the user 250 that action is to be taken to install the patch or fix the vulnerability. Additionally, a recovery plan directs the information handling system 202 to use an alternate path to trigger a similar diagnostic test while bypassing the original diagnostic test that is deemed vulnerable. The invention implements telemetry data which receives events from firmware/software in the form of IOA/IOC events. The shared library 216 can be scanned by the vulnerability scanning service computing module 232 to identify any possible vulnerabilities.

FIG. 3 illustrates a flowchart depicting selected elements of an embodiment of a method 300 for managing diagnostic testing of computing hardware. The method 300 may be performed by the information handling system 100, the information handling system 202, the diagnostic testing management computing module 210, the EC 212, and/or the telemetry computing module 218, the third-party information handling system 204, and/or the vulnerability scanning service computing module 232, and with reference to FIGS. 1-2. It is noted that certain operations described in method 300 may be optional or may be rearranged in different embodiments.

The diagnostic testing management computing module 210 can identify a particular computing hardware 214 for performing a diagnostic test, at 302. The particular computing hardware 214 can be not working/operating as intended, and/or experiencing functionality issues. In some examples, the diagnostic testing management computing module 210 can ping the computing hardware 214 periodically (e.g., every 1 minute, 5 minutes) for a functionality status to determine where to perform the diagnostic test at. In some examples, the particular computing hardware 214 can provide a functionality status update to the diagnostic testing management computing module 210 when not operating as intended and/or experiencing functionality issues to indicate that a diagnostic test is to be performed at the particular computing hardware 214. In some examples, the user 250 of the information handling system 202 can provide user input at the information handling system 202 indicating that the particular computing hardware 214 is not working/operating as intended, and/or experiencing functionality issues and that a diagnostic test is to be performed at the particular computing hardware 214.

The particular computing hardware 214 can be associated with a shared library 216. The shared library 216 can include a dynamic link library (DLL). The shared library 216 can facilitate communication with computing hardware 214, and in particular, a driver of the computing hardware 214, e.g., by another computing hardware of the information handling system 202 or computing module of the information handling system 202.

The diagnostic testing management computing module 210 can receive telemetry data associated with the particular computing hardware 214, at 304. Specifically, the telemetry computing module 218 can receive the telemetry data from the computing hardware 214. The telemetry computing module 218 can receive the telemetry data from the computing hardware 214 periodically (e.g., every 1 second, 1 minute), or in response to a request. In some examples, the particular computing hardware 214 can provide the telemetry data to the telemetry computing module 218 when the particular computing hardware 214 is not operating as intended and/or experiencing functionality issues.

The diagnostic testing management computing module 210 can receive the telemetry data from the telemetry computing module 218. The diagnostic testing management computing module 210 can receive the telemetry data from the telemetry computing module 218 periodically (e.g., every 1 second, 1 minute), or in response to a request. In some examples, the telemetry data can include an indicator of attack (IOA) and/or an indicator of compromise (IOC) associated with the particular computing hardware 214.

The diagnostic testing management computing module 210 can determine whether the telemetry data indicates a possible security event associated with the particular computing hardware 214, at 306. That is, the diagnostic testing management computing module 210 can determine whether the telemetry data includes an IOA and/or an IOC for the particular computing hardware 214. When the telemetry data includes an IOA and/or an IOC for the particular computing hardware 214, the particular computing hardware 214 can be subjected to a security event. The security event could include compromise of the particular computing hardware by an external third party (e.g., a "bad" actor).

In some examples, the diagnostic testing management computing module 210 determines that the telemetry data indicates the possible security event associated with the particular computing hardware 214 (at 306) and in response, provides data indicating the shared library 216 to the vulnerability scanning service computing module 232, at 310. That is, the information handling system 202 can communicate data indicating the shared library 216 over the network 206 to the information handling system 204.

The vulnerability scanning service computing module 232 can analyze/process the data indicating the shared library 216. That is, the vulnerability scanning service computing module 232 can include a listing/database of compromised assets, such as shared libraries. The vulnerability scanning service computing module 232 can compare the data indicating the shared library 216 with the listing/database of compromised assets. The listing/database of compromised assets can include a software bill of materials (SBOM or BOM). The SBOM can list all of the components that are associated with a piece of software, such as the shared library, licenses, and known vulnerabilities.

The information handling system 204 can transmit over the network 206 data indicating whether the shared library 216 includes a security vulnerability or not to the information handling system 202.

The information handling system 202, and in particular, the diagnostic testing management computing module 210, can receive from the information handling system 204, and in particular, the vulnerability scanning service computing module 232, the data indicating a security vulnerability of the shared library 216, at 312. The diagnostic testing management computing module 210 can determine whether the data indicates a security vulnerability or not of the shared library 216, at 314. In some examples, the diagnostic testing management computing module 210 determines that the data indicates a security vulnerability of the shared library 216 (at 314), and in response, identifies a diagnostic test 275 stored at the storage device 271 that is implemented at the particular computing hardware 214 via a side band communication channel of the particular computing hardware 214, at 316.

Specifically, the diagnostic testing management computing module 210 can access a control policy 273 (stored at the storage device 271) in response to the data indicating the security vulnerability of the shared library 216. The policy control can indicate that if the shared library 216 is compromised (security vulnerability), diagnostic testing utilizing the shared library 216 is restricted from being executed. In some examples, the policy control can further, in response to the data indicating the security vulnerability of the shared library 216, provide a notification to the user 250 (e.g., via a display device of the information handling system 202) of the security vulnerability of the shared library 216 and the particular computing hardware 214. The notification can indicate that action needs to be taken to correct the security vulnerability of the shared library 216 (e.g., a patch).

In some examples, the side band communication channel can be between the EC 212 and the particular computing hardware 214. That is, the diagnostic test 275 can be implemented at the particular computing hardware 214 via the side band communication channel between the EC 212 and the particular computing hardware 214. The identified diagnostic test 275 can be associated with the particular computing hardware 214, a driver of the particular computing hardware 214, and/or the shared library 216. That is, the identified diagnostic test 275 can test the features or parameters of the particular computing hardware 214, the driver of the particular computing hardware 214, and/or the shared library 216 to determine if the same are working/operating as intended, and/or if the same are experiencing functionality issues.

The EC 212 can implement, through the side band communication channel with the particular computing hardware 214, the (identified) diagnostic test 275 at the particular computing hardware 214, at 318. In some examples, the diagnostic test 275 is a self-test, or a power-on self-test (POST). The EC 212 can implement, through the side band communication channel with the particular computing hardware 214, the (identified) diagnostic test 275 at the particular computing hardware 214 independent of the shared library 216 (the shared library 216 is bypassed). That is, as the shared library 216 includes a security vulnerability, the EC 212 implements the diagnostic test 275 at the particular computing hardware 214 independent of the shared library 216. That is, the computing hardware 214 is tested without going through the shared library 216, or utilizing the shared library 216.

Furthermore, by implementing the diagnostic test 275 through the side band communication channel, another diagnostic test is prevented from being performed at the particular computing hardware 214 that utilizes the shared library 216. As the shared library 216 includes a security vulnerability (as determined at 314), by not employing the shared library 216 when performing the diagnostic test 275, compromise of the information handling system 202 is prevented. That is, safeguarding and restricting diagnostic tests utilizing the shared library 216 reduces the potential compromise of the information handling system 202. The in-band communication channel of the particular computing hardware 214 is bypassed such that the side band communication channel is implemented to utilize the diagnostic test 275.

The EC 212 determines whether the diagnostic test was successful at the particular computing hardware 214, at 320. In some examples, the EC 212 can determine whether the diagnostic test was successful at the particular computing hardware 214 by determining whether the particular computing hardware 214 is working/operating as intended, and/or if the particular computing hardware 214 is experiencing functionality issues. For example, the EC 212 can execute the diagnostic test at the particular computing hardware 214 by testing parameters of the particular computing hardware 214, including functionality of the particular computing hardware 214 and/or firmware of the particular computing hardware 214 and/or a driver of the particular computing hardware 214 and/or a configuration of the particular computing hardware 214. That is, the diagnostic test can test the particular computing hardware 214, the firmware of the particular computing hardware 214, the driver of the particular computing hardware 214, and the configuration of the particular computing hardware 214 to determine the functionality of each and whether each is functioning properly and as intended.

In some examples, the EC 212 can determine that the diagnostic test failed at the particular computing hardware 214 (at 320), and in response, perform a corrective action at the particular computing hardware 214, at 322. That is, the EC 212 performs the correction action at the particular computing hardware 214 based on the diagnostic test failing at the particular computing hardware 214.

The EC 212 performs the remediation action independent of user action by the user 250 of the information handling system. That is, the EC 212 performs the remediation action at the information handling system 202 (and specifically, at the particular computing hardware 214) automatically in response to determining that the remediation action is to be performed and without user interaction/input. The EC 212 can perform the remediation action (or remediation actions) to provide operability of the computing features of the particular computing hardware 214 by improving performance capabilities of the information handling system 202 (such as particular computing hardware 214). That is, performing the remediation action(s) to the particular computing hardware 214 by the EC 212 improves the performance capabilities of the information handling system 202 (particularly computing hardware 214) such that the functionality and the operability of the computing features of the particular computing hardware 214 is improved. In some examples, the EC 212 can perform the remediation action (or remediation actions) to improve the performance capabilities of the information handling system 202 without user action/input by the user 250 (independent of user action/input by the user 250).

In some examples, the EC 212, in response to the diagnostic test failing at the particular computing hardware 214, can perform the corrective action of uninstalling a driver associated with the particular computing hardware 214. That is, the EC 212 can uninstall, or facilitate uninstallation, of the driver at the particular computing hardware 214.

In some examples, the EC 212, in response to the diagnostic test failing at the particular computing hardware 214, can perform the corrective action of updating a driver associated with the particular computing hardware 214. That is, the EC 212 can update, or facilitate updating, of the driver at the particular computing hardware 214.

In some examples, the EC 212, in response to the diagnostic test failing at the particular computing hardware 214, can perform the corrective action of disabling a driver associated with the particular computing hardware 214. That is, the EC 212 can disable, or facilitate disabling, of the driver at particular computing hardware 214.

In some examples, the EC 212, in response to the diagnostic test failing at the particular computing hardware 214, can perform the corrective action of installing a new driver associated with the particular computing hardware 214. That is, the EC 212 can install, or facilitate installing, of the new driver at the particular computing hardware 214.

In some examples, the EC 212, in response to the diagnostic test failing at the particular computing hardware 214, can perform the corrective action of updating firmware associated with the particular computing hardware 214. That is, the EC 212 can update, or facilitate updating, of the firmware at the particular computing hardware 214.

In some examples, the EC 212, in response to the diagnostic test failing at the particular computing hardware 214, can perform the corrective action of updating a configuration associated with the particular computing hardware 214. That is, the EC 212 can update, or facilitate updating of, the configuration at the particular computing hardware 214.

The EC 212 can perform a corrective action at the shared library 216, at 324. That is, the EC 212 performs the correction action at the shared library 216 based on the detected security vulnerability of the shared library 216 (as determined at step 314). In some examples, the EC 212 can install, or facilitate installing of, a corrective patch at shared library 216.

In some examples, the EC 212 can determine that the diagnostic test passed at the particular computing hardware 214 (at 320), and in response, returns to step 316. That is, the diagnostic testing management computing module 210 identifies a further diagnostic test 275 stored at the storage device 271 that is implemented at the particular computing hardware 214 via a side band communication channel of the particular computing hardware 214.

In some examples, the diagnostic testing management computing module 210 determines that the data does not indicate a security vulnerability of the shared library 216 (at 314), and in response, identifies a further diagnostic test 275 stored at the storage device 271 that is implemented at the particular computing hardware 214 via an in-band communication channel of the particular computing hardware 214, at 326.

In some examples, the in-band communication channel can be between the diagnostic testing management computing module 210 and the particular computing hardware 214. That is, the further diagnostic test 275 can be implemented at the particular computing hardware 214 via the in-band communication channel between the diagnostic testing management computing module 210 and the particular computing hardware 214. The further diagnostic test 275 can be associated with the particular computing hardware 214, a driver of the particular computing hardware 214, and/or the shared library 216. That is, the further diagnostic test 275 can test the features or parameters of the particular computing hardware 214, the driver of the particular computing hardware 214, and/or the shared library 216 to determine if the same are working/operating as intended, and/or if the same are experiencing functionality issues.

The diagnostic testing management computing module 210 can implement, through the in-band communication channel with the particular computing hardware 214, the further diagnostic test 275 at the particular computing hardware 214, at 328. The diagnostic testing management computing module 210 can implement, through the in-band communication channel with the particular computing hardware 214, the further diagnostic test 275 at the particular computing hardware 214 utilizing/through the shared library 216.

The diagnostic testing management computing module 210 determines whether the further diagnostic test was successful at the particular computing hardware 214, at 330. In some examples, the diagnostic testing management computing module 210 can determine whether the diagnostic test was successful at the particular computing hardware 214 by determining whether the particular computing hardware 214 is working/operating as intended, and/or if the particular computing hardware 214 is experiencing functionality issues. For example, the diagnostic testing management computing module 210 can execute the further diagnostic test at the particular computing hardware 214 by testing parameters of the particular computing hardware 214, including functionality of the particular computing hardware 214 and/or firmware of the particular computing hardware 214 and/or a driver of the particular computing hardware 214 and/or a configuration of the particular computing hardware 214. That is, the diagnostic test can test the particular computing hardware 214, the firmware of the particular computing hardware 214, the driver of the particular computing hardware 214, and the configuration of the particular computing hardware 214 to determine the functionality of each and whether each is functioning properly and as intended.

In some examples, the diagnostic testing management computing module 210 can determine that the diagnostic test failed at the particular computing hardware 214 (at 330), and in response, perform a corrective action at the particular computing hardware 214, at 332. That is, the diagnostic testing management computing module 210 performs the correction action at the particular computing hardware 214 based on the diagnostic test failing at the particular computing hardware 214.

In some examples, the diagnostic testing management computing module 210 can determine that the diagnostic test passed at the particular computing hardware 214 (at 330), and in response, returns to step 326. That is, the diagnostic testing management computing module 210 identifies a further additional diagnostic test 275 stored at the storage device 271 that is implemented at the particular computing hardware 214 via an in-band communication channel of the particular computing hardware 214, at 326.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, “and” is both joint and several, unless expressly indicated otherwise or indicated otherwise by context. Therefore, herein, “A and B” means “A and B, jointly or severally,” unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing diagnostic testing of computing hardware of an information handling system, including:

identifying a particular computing hardware for performing a diagnostic test at, the particular computing hardware associated with a shared library;

receiving telemetry data associated with the particular computing hardware;

determining that the telemetry data indicates a possible security event associated with the particular computing hardware, and in response:

providing data indicating the shared library to a third-party vulnerability scanning service;

receiving, from the third-party vulnerability scanning service, data indicating a security vulnerability of the shared library;

in response to receiving the data indicating the security vulnerability of the shared library:

identifying a diagnostic test that is implemented at the particular computing hardware via a side band communication channel of the particular computing hardware;

implementing, through the side band communication channel, the diagnostic test at the particular computing hardware;

determining whether the diagnostic test was successful at the particular computing hardware; and determining that the diagnostic test failed at the particular computing device, and in response, performing, independent of user action, a corrective action at the particular computing hardware.

2. The computer-implemented method of claim 1, wherein receiving the telemetry data includes receiving telemetry data including an indicator of attack (IOA) or an indicator of compromise (IOC) associated with the particular computing hardware.

3. The computer-implemented method of claim 1, wherein the shared library is a dynamic link library (DLL).

4. The computer-implemented method of claim 1, wherein the side band communication channel is between an embedded controller (EC) and the particular computing hardware.

5. The computer-implemented method of claim 4, wherein the diagnostic test is implemented independent of the shared library.

6. The computer-implemented method of claim 5, further including preventing another diagnostic test to be performed at the particular computing hardware that utilizes the shared library.

7. The computer-implemented method of claim 1, wherein performing the remediation action further includes installing a new driver at the information handling system for the particular computing hardware.

8. The computer-implemented method of claim 1, wherein performing the remediation action further includes installing a patch at the shared library.

9. An information handling system comprising a processor having access to memory media storing instructions executable by the processor to perform operations, comprising:

identifying a particular computing hardware for performing a diagnostic test at, the particular computing hardware associated with a shared library;

receiving telemetry data associated with the particular computing hardware;

determining that the telemetry data indicates a possible security event associated with the particular computing hardware, and in response:

providing data indicating the shared library to a third-party vulnerability scanning service;

receiving, from the third-party vulnerability scanning service, data indicating a security vulnerability of the shared library;

in response to receiving the data indicating the security vulnerability of the shared library:

identifying a diagnostic test that is implemented at the particular computing hardware via a side band communication channel of the particular computing hardware;

implementing, through the side band communication channel, the diagnostic test at the particular computing hardware;

determining whether the diagnostic test was successful at the particular computing hardware; and determining that the diagnostic test failed at the particular computing device, and in response, performing, independent of user action, a corrective action at the particular computing hardware.

10. The information handling system of claim 9, wherein receiving the telemetry data includes receiving telemetry data including an indicator of attack (IOA) or an indicator of compromise (IOC) associated with the particular computing hardware.

11. The information handling system of claim 9, wherein the shared library is a dynamic link library (DLL).

12. The information handling system of claim 9, wherein the side band communication channel is between an embedded controller (EC) and the particular computing hardware.

13. The information handling system of claim 12, wherein the diagnostic test is implemented independent of the shared library.

14. The information handling system of claim 13, the operations further including preventing another diagnostic test to be performed at the particular computing hardware that utilizes the shared library.

15. The information handling system of claim 9, wherein performing the remediation action further includes installing a new driver at the information handling system for the particular computing hardware.

16. The information handling system of claim 9, wherein performing the remediation action further includes installing a patch at the shared library.

17. A non-transitory computer-readable medium storing software comprising instructions executable by one or more computers which, upon such execution, cause the one or more computers to perform operations comprising:

identifying a particular computing hardware for performing a diagnostic test at, the particular computing hardware associated with a shared library;

receiving telemetry data associated with the particular computing hardware;

determining that the telemetry data indicates a possible security event associated with the particular computing hardware, and in response:

providing data indicating the shared library to a third-party vulnerability scanning service;

receiving, from the third-party vulnerability scanning service, data indicating a security vulnerability of the shared library;

in response to receiving the data indicating the security vulnerability of the shared library:

identifying a diagnostic test that is implemented at the particular computing hardware via a side band communication channel of the particular computing hardware;

implementing, through the side band communication channel, the diagnostic test at the particular computing hardware;

determining whether the diagnostic test was successful at the particular computing hardware; and determining that the diagnostic test failed at the particular computing device, and in response, performing, independent of user action, a corrective action at the particular computing hardware.

18. The non-transitory computer-readable medium of claim 17, wherein receiving the telemetry data includes receiving telemetry data including an indicator of attack (IOA) or an indicator of compromise (IOC) associated with the particular computing hardware.

19. The non-transitory computer-readable medium of claim 17, wherein the shared library is a dynamic link library (DLL).

20. The non-transitory computer-readable medium of claim 17, wherein the side band communication channel is between an embedded controller (EC) and the particular computing hardware.

* * * * *